United States Patent
Kumhyr et al.

(10) Patent No.: US 7,137,108 B1
(45) Date of Patent: Nov. 14, 2006

(54) IDENTIFYING NON-EXTERNALIZED TEXT STRINGS THAT ARE NOT HARD-CODED

(75) Inventors: David Bruce Kumhyr, Austin, TX (US); Dae-Suk Chung, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 1115 days.

(21) Appl. No.: 09/697,446

(22) Filed: Oct. 26, 2000

(51) Int. Cl.
G06F 9/45 (2006.01)
G06F 15/00 (2006.01)

(52) U.S. Cl. .................. 717/142; 717/143; 717/146; 717/147

(58) Field of Classification Search ........ 717/114–118, 717/140–158; 700/11, 23, 67; 707/2, 3, 707/4, 5, 100, 102, 8; 710/12, 20, 52
See application file for complete search history.

(56) References Cited

U.S. PATENT DOCUMENTS

| | | | | |
|---|---|---|---|---|
| 5,012,405 A | * | 4/1991 | Nishikado et al. ............. 707/8 |
| 5,115,490 A | * | 5/1992 | Komuro et al. ............. 711/202 |
| 5,222,225 A | * | 6/1993 | Groves ........................ 710/22 |
| 5,357,431 A | * | 10/1994 | Nakada et al. ............. 715/531 |
| 5,414,841 A | * | 5/1995 | Bingham et al. ............ 707/100 |
| 5,423,032 A | * | 6/1995 | Byrd et al. .................... 707/5 |
| 5,495,604 A | | 2/1996 | Harding et al. ............. 395/600 |
| 5,530,794 A | * | 6/1996 | Luebbert ................... 715/524 |
| 5,544,048 A | * | 8/1996 | Dugan et al. ............... 715/530 |
| 5,657,447 A | * | 8/1997 | Leung et al. .................. 707/1 |
| 5,704,060 A | * | 12/1997 | Del Monte ............. 707/104.1 |
| 5,706,496 A | * | 1/1998 | Noguchi et al. ............... 707/3 |
| 5,893,134 A | * | 4/1999 | O'Donoghue et al. ...... 715/536 |
| 5,913,214 A | * | 6/1999 | Madnick et al. ............... 707/10 |
| 5,930,508 A | * | 7/1999 | Faraboschi et al. ......... 717/158 |
| 5,974,256 A | | 10/1999 | Matthews et al. .......... 395/705 |
| 5,974,372 A | | 10/1999 | Barnes et al. .................. 704/8 |
| 6,041,323 A | * | 3/2000 | Kubota ......................... 707/5 |
| 6,055,538 A | * | 4/2000 | Kessenich et al. .......... 707/101 |
| 6,076,084 A | * | 6/2000 | Harlan .......................... 707/1 |
| 6,094,649 A | * | 7/2000 | Bowen et al. ................. 707/3 |
| 6,120,552 A | * | 9/2000 | Kurtzberg et al. .......... 717/142 |
| 6,275,978 B1 | * | 8/2001 | Bell .......................... 717/143 |
| 6,304,870 B1 | * | 10/2001 | Kushmerick et al. .......... 707/4 |
| 6,363,392 B1 | * | 3/2002 | Halstead et al. ............ 707/102 |
| 6,442,598 B1 | * | 8/2002 | Wright et al. ............... 709/217 |

OTHER PUBLICATIONS

Kanji DATA Tokenizer, Sep. 1, 1986, IBM Technical Disclosure Bulletin, vol. 29, issue 4, p. 1838.*

(Continued)

*Primary Examiner*—Wei Zhen
*Assistant Examiner*—Satish S. Rampuria
(74) *Attorney, Agent, or Firm*—Duke W. Yee; Jeffrey S. LaBaw; Betty Formby

(57) ABSTRACT

A method, computer program product and data processing system for identifying non-externalized strings that are not hard-coded. In one embodiment, a method comprises the step of scanning a code, e.g., Java, line by line until a pair of string delimiters is identified. Once a pair of string delimiters is identified, the method further comprises the step of determining whether the string within the pair of string delimiters identified is a path name to a resource file, e.g., resource bundle. If the string is a path name to the resource file, then the string is a non-externalized string that is not hard-coded. If the string is not a path name to the resource file, then the string may be identified as a possible hard-coded string.

21 Claims, 2 Drawing Sheets

OTHER PUBLICATIONS

Multi-Word Abbreviation Resolution, Jul. 1, 1993, IBM Technical Disclosure Bulletin, vol. 36, Issue 7, p. 359-362.*

IBM Technical Disclosure Bulletin, Character Scanning Instruction, IBM Technical Disclosure Bulletin, Feb. 1968, p. 1-3.*

Kacem et al., Embedded formulas extraction, IEEE, vol. 1, Sep. 3-7, 2000 pp. 676-680.*

Umeda et al., The parsing program for automatic text-to-speech synthesis developed at the electrotechnical laboratory in 1968, IEEE, vol. 23, Issue 2, Apr. 1975 pp. 183-188.*

* cited by examiner

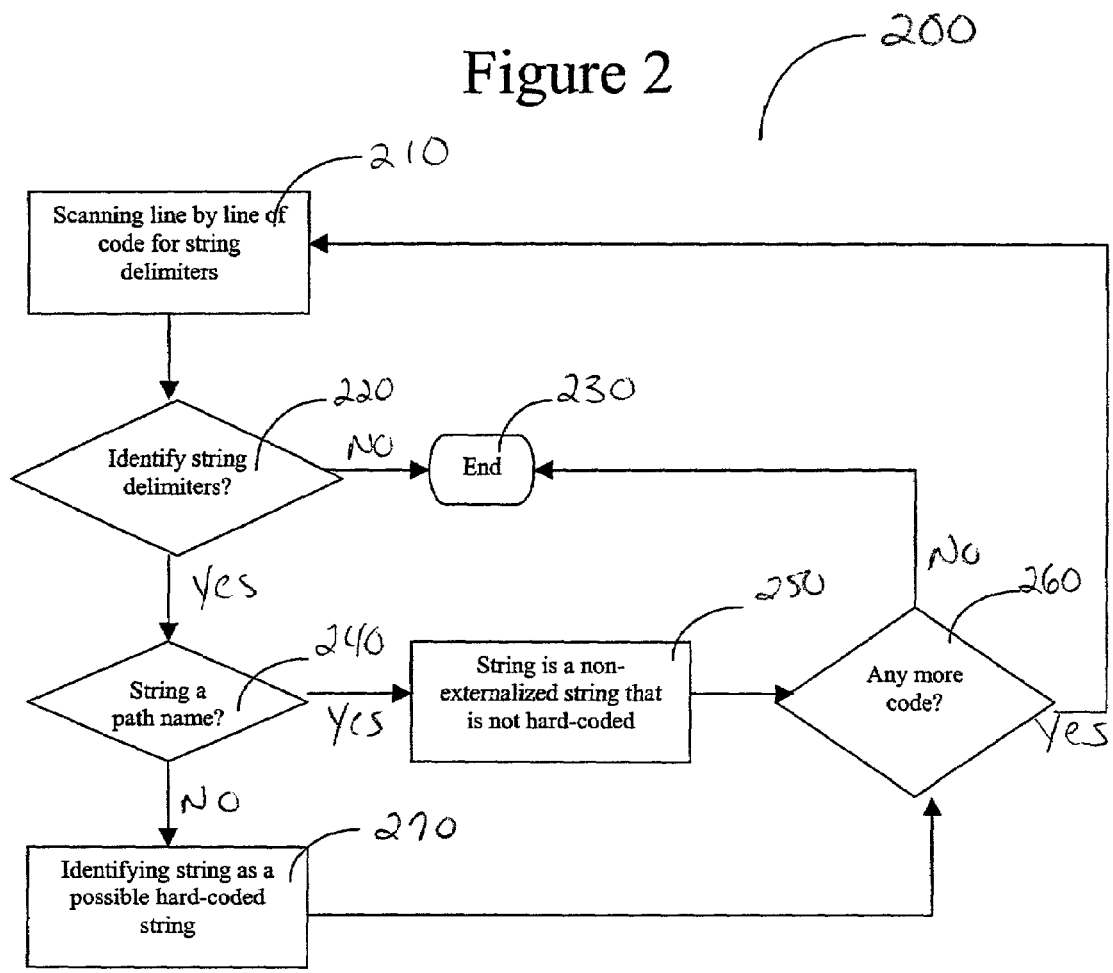

IDENTIFYING NON-EXTERNALIZED TEXT STRINGS THAT ARE NOT HARD-CODED

CROSS REFERENCE TO RELATED APPLICATIONS

The present invention is related to the following U.S. patent applications which are incorporated herein by reference:

Ser. No. 09/697,448 entitled "Detection of Resource Exceptions" filed Oct. 26, 2000.

Ser. No. 09/697,445 entitled "Pre-Processing Code to Identify and Modify Format of Keys" filed Oct. 26, 2000.

TECHNICAL FIELD

The present invention relates to the field of internationalization, and more particularly to a scanning program that identifies non hard-coded text strings.

BACKGROUND INFORMATION

Internationalization is a process of enabling a program, e.g., Java™, to run internationally. That is, an internationalized program has the flexibility to run correctly in any country. An internationalized program must be able to read, write and manipulate localized text. Furthermore, an internationalized program must conform to local customs when displaying dates and times, formatting numbers and sorting strings.

Internationalization is becoming increasingly important with the explosive growth of the Internet and the World Wide Web where an ever increasing number of computer users are from various locales. A locale represents a geographic, cultural or political region. One of the problems with internationalization involves the use of text strings that may be hard-coded in the program, e.g., Java™. Hard-coded text strings refer to text that will not vary with the locale. That is, the text strings may appear in English even when the program is run on the French locale. Various object-oriented languages such as Java™ have developed tools to assist in developing internationalized programs and allowing text strings to appear in the language of the locale. A discussion of object-oriented programming languages and in particular Java is deemed appropriate.

In an object-oriented programming language such as Java™, a class is a collection of data and methods that operate on that data. The data and methods taken together describe the state and behavior of what is commonly referred to as an object. An object in essence includes data and code where the code manipulates the data. Hence a software application may be written using an object-oriented programming language such as Java™ whereby the program's functionality is implemented using objects.

Unlike many programming languages, Java™ is compiled into machine independent code commonly referred to as bytecodes instead of machine dependent code, i.e. executable code. Bytecodes are stored in a particular file format commonly referred to as a "class file" that includes bytecodes for methods of a class. In addition to the bytecodes for methods of a class, the class file includes a symbol file as well as other ancillary information.

A computer program embodied as Java™ bytecodes in one or more class files is platform independent. The computer program may be executed, unmodified, on any computer that is able to run an implementation of what is commonly referred to as a Java™ virtual machine. The Java™ virtual machine is not an actual hardware platform, but rather a low level software emulator that can be implemented on many different computer processor architectures and under many different operating systems. The Java™ virtual machine reads and interprets each bytecode so that the instructions may be executed by the native processor. Hence a Java™ bytecode is capable of functioning on any platform that has a Java™ virtual machine implementation available. However, bytecode interpretation detracts from processor performance since the microprocessor has to spend some of its processing time interpreting bytecode instructions. Compilers commonly referred to as "just in time (JIT)" were developed to improve the performance of Java virtual machines. A JIT compiler translates Java™ bytecodes into the processor's native machine code during runtime. The processor then executes the compiled native machine code.

As stated above Java™ has developed tools to assist in developing internationalized programs and allowing text strings to appear in the language of the locale. One such tool is the use of resource files commonly referred to in Java™ as resource bundles. A resource bundle class may be used for externalizing text strings, i.e. not hard-coding strings in the program. The resource bundle class represents a bundle of resources that may be looked up by name. The resources may include appropriate text strings for a given locale that are indexed by what are commonly referred to as keys. Keys are free formatted strings that appear in the program code as well as in the resource bundle thereby allowing the program to access the externalized string. By having resource bundles associated with particular locales, e.g., a resource file with resources associated with the US English locale, a resource file with resources associated with the French locale and so forth, appropriate text strings associated with the particular locale may be loaded at runtime.

However, software developers may still hard-code their strings into their application instead of externalizing them and loading them from the resource bundle. Various scanning programs have been developed which attempt to detect hard-coded strings. Unfortunately, these scanning programs simply detect as hard-coded strings all text enclosed within double quotes (" ") which are used as string delimiters in Java™ (as well as other programming languages). However, not all text enclosed within double quotes are hard-coded strings. The text enclosed within the double quotes may be a path name to a resource file, e.g., resource bundle.

It would therefore be desirable to develop a scanning program that identifies non-externalized strings, e.g., path names to resource files, that are not hard-coded but that are enclosed within string delimiters.

SUMMARY

The problems outlined above may at least in part be solved in some embodiments by a scanning program that scans a code, e.g., Java™, line by line until a pair of string delimiters is identified. Once a pair of string delimiters is identified, the scanning program determines whether the string within the pair of string delimiters identified is a path name to a resource file, e.g., resource bundle. If the string is a path name to the resource file, then the string is not a hard-coded string. If the string is not a path name to the resource file, then the string may be identified as a possible hard-coded string.

In one embodiment, a method for identifying non-externalized strings that are not hard-coded comprises the step of scanning a code for a pair of string delimiters. The method further comprises the step of determining whether the string within the pair of string delimiters identified is a path name to a resource file. If the string is a path name to the resource file, then the string is a non-externalized string that is not hard-coded. If the string is not a path name to the resource file, then the string may be identified as a possible hard-coded string.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which:

FIG. 2 is a flowchart of a method for identifying non-externalized strings that are not hard-coded.

DETAILED DESCRIPTION

Figure 1:
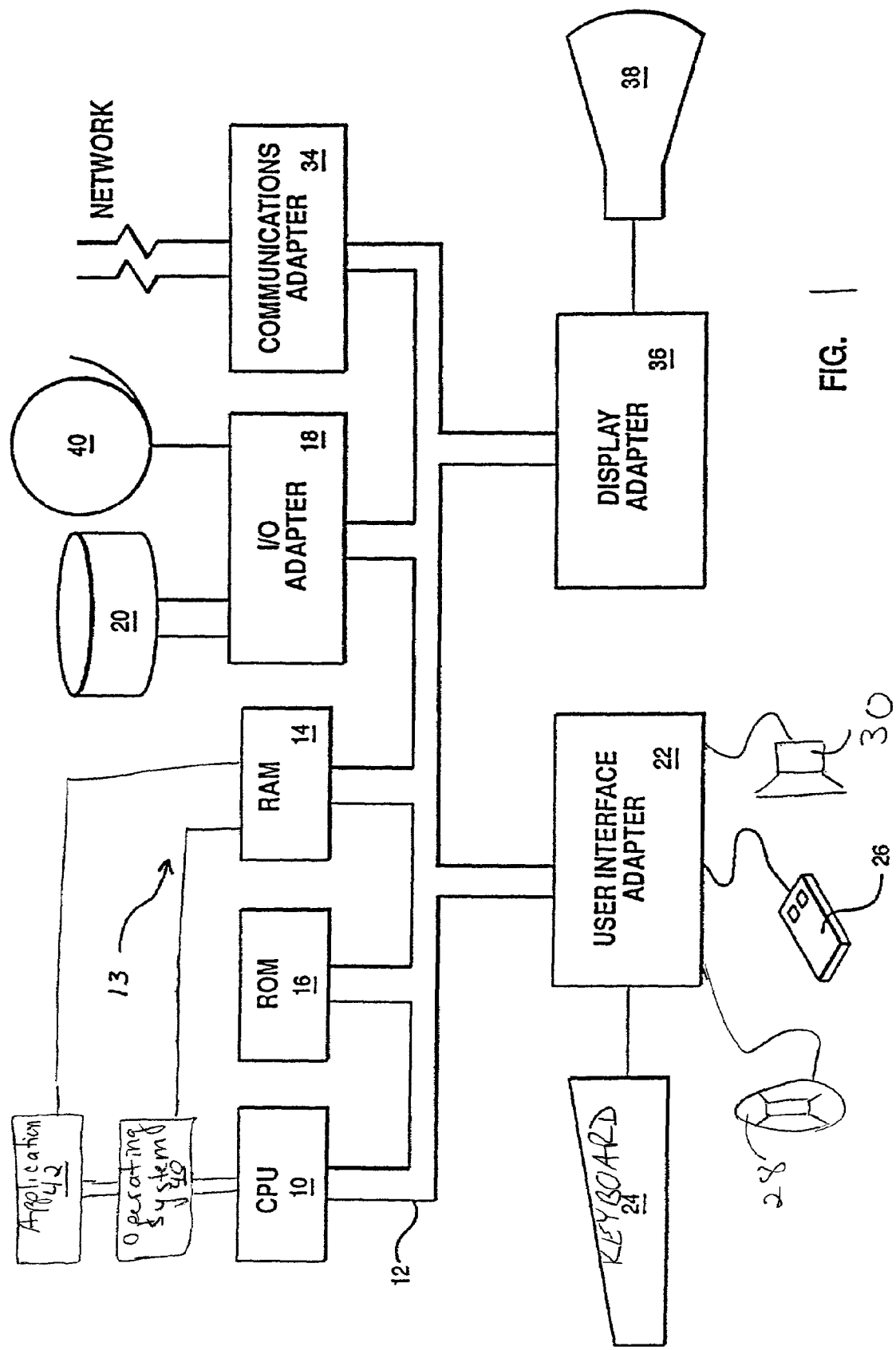
FIG. 1 illustrates a data processing system configured in accordance with the present invention.

The present invention comprises a method, computer program product and data processing system for identifying non-externalized strings that are not hard-coded. In one embodiment of the present invention a scanning program scans a code, e.g., Java™, line by line until a pair of string delimiters is identified. Once a pair of string delimiters is identified, the scanning program determines whether the string within the pair of string delimiters identified is a path name to a resource file, e.g., resource bundle. If the string is a path name to the resource file, then the string is a non-externalized string that is not hard-coded. If the string is not a path name to the resource file, then the string may be identified as a possible hard-coded string. It is noted that the even though the following discusses the present invention in conjunction with a Java™ programming environment the present invention may be implemented in any type of programming environment where the programming language has the capability of externalizing text strings in resource files.

FIG. 1—Computer System

FIG. 1 illustrates a typical hardware configuration of data processing system 13 which is representative of a hardware environment for practicing the present invention. Data processing system 13 has a central processing unit (CPU) 10, such as a conventional microprocessor, coupled to various other components by system bus 12. An operating system 40, e.g., DOS, OS/2™, runs on CPU 10 and provides control and coordinates the function of the various components of FIG. 1. An object-oriented programming system, such as Java™ 42, runs in conjunction with operating system 40 and provides output calls to operating system 40 which implements the various functions to be performed by the application 42. Read only memory (ROM) 16 is coupled to system bus 12 and includes a basic input/output system ("BIOS") that controls certain basic functions of data processing system 13. Random access memory (RAM) 14, I/O adapter 18, and communications adapter 34 are also coupled to system bus 12. It should be noted that software components including operating system 40 and application 42 are loaded into RAM 14 which is the computer system's main memory. I/O adapter 18 may be a small computer system interface ("SCSI") adapter that communicates with disk units 20, e.g., disk drive, and tape drives 40. It is noted that the scanning program of the present invention that identifies non-externalized strings that are not hard-coded may reside in disk unit 20 or in application 42. Communications adapter 34 interconnects bus 12 with an outside network enabling data processing system 13 to communication with other such systems. Input/Output devices are also connected to system bus 12 via a user interface adapter 22 and a display adapter 36. Keyboard 24, trackball 28, mouse 26 and speaker 30 are all interconnected to bus 12 through user interface adapter 22. Event data may be input to the object-oriented programming system through any of these devices. A display monitor 38 is connected to system bus 12 by display adapter 36. In this manner, a user is capable of inputting to system 13 through keyboard 24, trackball 28 or mouse 26 and receiving output from system 13 via display 38 or speaker 30.

Preferred implementations of the invention include implementations as a computer system programmed to execute the method or methods described herein, and as a computer program product. According to the computer system implementations, sets of instructions for executing the method or methods are resident in the random access memory 14 of one or more computer systems configured generally as described above. Until required by the computer system, the set of instructions may be stored as a computer program product in another computer memory, for example, in disk drive 20 (which may include a removable memory such as an optical disk or floppy disk for eventual use in disk drive 20). Furthermore, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

FIG. 2—Method for Identifying Non-Externalized Strings that are not Hard-Coded

FIG. 2 illustrates a method 200 for identifying non-externalized strings that are not hard-coded. As stated in the Background Information section, software developers may hard-code their strings into their application, e.g., Java™, instead of externalizing them and loading them from the external resource file, e.g., resource bundle. Various scanning programs have been developed which attempt to detect hard-coded strings. Unfortunately, these scanning programs simply detect as hard-coded strings all text enclosed within double quotes, i.e. string delimiters. However, not all text enclosed within double quotes are hard-coded strings. The text enclosed within the double quotes may be a path name to a resource file, e.g., resource bundle. Method 200 is a method that identifies non-externalized strings, e.g., path names to resource files, that are not hard-coded that are enclosed within string delimiters.

In step 210, a scanning program scans the code of an application program 42 line by line for string delimiters until the scanning program identifies a pair of string delimiters. String delimiters refers to the quotes (" ") that mark the beginning and end of a text string. For example, in the classic Hello World program written in Java™ as shown below public class HelloWorld {
      public static void main

```
(String args[ ]) {
    System.out.println("Hello World");
    }
}
``` the string delimiters mark the beginning and end of the text string "Hello World."

A determination is then made in step 220 as to whether the scanning program has identified a pair of string delimiters that mark the beginning and end of a text string. If the scanning program has not identified a pair of string delimiters, then method 200 is terminated at step 230. If the scanning program has identified a pair of string delimiters, the scanning program determines whether the string within the string delimiters is a path name to the resource file in step 240. As stated in the Background Information section, a resource file is commonly referred to as a resource bundle in Java™. It is further noted that a path name to a resource file, e.g., resource bundle, is a non-externalized string that is not hard-coded but is enclosed within double quotes within a program, e.g., Java™. For example, in the Java™ code shown below rbCal=ResourceLoader.getBundle("com.tivoli.uif.Resources.CalendarResources");

setTitle(ResourceLoader.getString(rbCal, "Holiday Title");

the string "com.tivoli.uif.Resources.CalendarResources" is a path name to a resource bundle. Path names to resource bundles are commonly referred to as uniform resource locator (URL). URL's are commonly identified by their dotted signature. It is noted that rbCal is a resource bundle where the method ResourceLoader retrieves calender resources from the URL "com.tivoli.uif.Resources.CalendarResources." It is further noted that the second line of the above written Java™ code sets the title to the window to an externalized string "Holiday Title" located in the resource bundle, rbCal. That is, the method ResourceLoader will retrieve the proper string associated with the language of the locale. For example, if the locale is an American locale, then the holiday title on the window may appear as "Christmas." If the locale is a Spanish locale, then the holiday title on the window may appear as "Navidad."

Referring to the above example of Java™ code, the scanning program may identify the string delimiters that mark the beginning and end of the text string "com.tivoli.uif.Resources.CalendarResources" in step 220. In step 240, a determination is made by the scanning program as to whether the string within the string delimiters identified in step 220 is a non-externalized string that is not hard-coded. If the scanning program determines that the string within the string delimiter is a non-externalized string that is not hard-coded, then the scanning program will not flag the string as a possible hard-coded string in step 250. As stated above, the scanning program will identify the string within the string delimiters as a non-externalized string that is not hard-coded if the string is a URL identified from its dotted signature, e.g., "com.tivoli.uif.Resources.CalendarResources." A determination is then made in step 260 as to whether there is any more code to scan by the scanning program. If there is no more code to scan by the scanning program, then method 200 is terminated at step 230. If there is more code to scan by the scanning program, then method 200 proceeds to scan the remaining code for string delimiters in step 210. It is noted for clarity that if the scanning program has identified a pair of string delimiters in a particular line of code in step 220 and there is more code within that particular line, then the scanning program may continue to scan the remainder of that particular line of code and the remaining line(s) of code until the scanning program identifies a pair of string delimiters.

If the scanning program determines in step 240 that the string within the string delimiter is not a path name to a resource file, e.g., resource bundle, then the scanning program identifies, i.e. flags, the string as a possible hard-coded string in step 270. For example, in the second line of code of the above example, the string "Holiday Title" may not be identified as a path name in step 240 because "Holiday Title" does not exhibit a dotted signature. Therefore, the string "Holiday Title" may be identified as a possible hard-coded string in step 270. A determination is then made in step 260 as to whether there is any more code to scan by the scanning program. If there is no more code to scan by the scanning program, then method 200 is terminated at step 230. If there is more code to scan by the scanning program, then method 200 proceeds to scan the remaining code for string delimiters in step 210. It is noted for clarity that if the scanning program has identified a pair of string delimiters in a particular line of code in step 220 and there is more code within that particular line, then the scanning program may continue to scan the remainder of that particular line of code and the remaining line(s) of code until the scanning program identifies a pair of string delimiters.

It is noted that the scanning program may reside in disk unit 20 or application 42. It is further noted that the scanning program of the present invention may be implemented to detect non-externalized strings that are not hard-coded in any type of programming language that has the capability of externalizing text strings in resource files.

Although the method, computer program product and data processing system of the present invention is described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims. It is noted that the headings are used only for organizational purposes and not meant to limit the scope of the description or claims.

The invention claimed is:

1. A method for identifying hard-coded strings that require conversion, the method comprising the computer-implemented steps of:

scanning programming code for a first pair of string delimiters that are used to delimit text strings;

determining whether a text string within said first pair of string delimiters is a path name to a resource file;

if said text string is not a path name to said resource file then flagging said string as a possible hard-coded string; and wherein said text string is not flagged as a possible hard-coded string if said text string is a path name to said resource file.

2. The method as recited in clam 1, wherein said programming code comprises platform-independent byte code.

3. The method as recited in clam 1, wherein said path name is a uniform resource locator.

4. The method as recited in clam 1, wherein said path name is a resource bundle.

5. The method as recited in clam 1, wherein said text string within said first pair of string delimiters is a path name to said resource file if said text string is in a dot delimited notation.

6. The method as recited in clam 1, wherein said programming code is scanned line by line until said first pair of string delimiters is identified.

7. The method as recited in clam 6, wherein if there is any more programming code to be scanned after said first pair of string delimiters is identified, then the method further comprises the step of:
   continuing to scan said programming code for a second pair of delimiters.

8. A computer program product in a computer readable medium for identifying hard-coded string that require conversion, comprising:
   programming operable for scanning programming code for a first pair of string delimiters that are used to delimit text strings;
   programming operable for determining whether a text string within said first pair of string delimiters is a path name to a resource file;
   programming operable for flagging said text string as possible hard-coded string if said string is not a path name to said resource file; and
   wherein said text string is not flagged as a possible hard-coded string if said text string is a path name to said resource file.

9. The computer program product as recited in claim 8, wherein said programming code comprises platform-independent byte code.

10. The computer program product as recited in claim 8, wherein said path name is a uniform resource locator.

11. The computer program product as recited in claim 8, wherein said resource file is a resource bundle.

12. The computer program product as recited in claim 8, wherein said text string within said first pair of string delimiters is a path name to said resource file if said text string is in a dot delimited notation.

13. The computer program product as recited in claim 8, wherein said programming code is scanned line by line until said first pair of string delimiters is identified.

14. The computer program product as recited in claim 13, wherein if there is any more programming code to be scanned after said first pair of string delimiters is identified, then the method further comprises:
   programming operable for continuing to scan said programming code for a second pair of delimiters.

15. A data processing system, comprising:
   a processor; and
   a memory unit for storing instructions of said processor;
   an input mechanism;
   an output mechanism;
   a bus system for coupling the processor to the memory unit, input mechanism, and output mechanism;
   means for scanning programming code for a first pair of string delimiters that are used to delimit text strings;
   means for determining whether a text string within said first pair of string delimiters is a path name to a resource file;
   means for flagging said string as a possible hard-coded string if said text string is not a path name to said resource file; and
   means for not flagging said text string is not flagged as a possible hard-coded string if said text string is a path name to said resource file.

16. The data processing system as recited in claim 15, wherein said programming code comprises platform-independent byte code.

17. The data processing system as recited in claim 15, wherein said path name is a uniform resource locator.

18. The data processing system as recited in claim 15, wherein said resource file is a resource bundle.

19. The data processing system as recited in claim 15, wherein said string within said first pair of string delimiters is a path name to said resource file if said string is in a dot delimited notation.

20. The data processing system as recited in claim 15, wherein said programming code is scanned line by line until said first pair of string delimiters is identified.

21. The data processing system as recited in claim 20, wherein if there is any more programming code to be scanned after said first pair of string delimiters is identified, then the method further comprises:
   means for continuing to scan said programming code for a second pair of delimiters.

* * * * *